(12) United States Patent
Ohashi et al.

(10) Patent No.: US 11,204,724 B2
(45) Date of Patent: Dec. 21, 2021

(54) PRINTING SYSTEM, PRINTING SYSTEM CONTROL METHOD, PRINTING APPARATUS, TERMINAL DEVICE, AND NON-TRANSITORY COMPUTER-READABLE STORAGE MEDIUM STORING PROGRAM FOR CONTROLLING ACCESS TO PRINT JOB DATA ACCESSIBLE FROM THE TERMINAL DEVICE

(71) Applicant: SEIKO EPSON CORPORATION, Tokyo (JP)

(72) Inventors: Kazuki Ohashi, Shiojiri (JP); Shinsuke Kubota, Matsumoto (JP); Takayuki Yamamoto, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/900,564

(22) Filed: Jun. 12, 2020

(65) Prior Publication Data
US 2020/0394003 A1   Dec. 17, 2020

(30) Foreign Application Priority Data
Jun. 14, 2019   (JP) .............................. JP2019-110915

(51) Int. Cl.
*G06F 3/12* (2006.01)
(52) U.S. Cl.
CPC .......... *G06F 3/1222* (2013.01); *G06F 3/1238* (2013.01); *G06F 3/1285* (2013.01)
(58) Field of Classification Search
None
See application file for complete search history.

(56) References Cited

U.S. PATENT DOCUMENTS

| | | | |
|---|---|---|---|
| 2004/0117389 A1* | 6/2004 | Enami | G06F 3/1285 |
| 2015/0029551 A1 | 1/2015 | Okada | |
| 2016/0124686 A1* | 5/2016 | Maeda | G06F 3/1292 358/1.14 |
| 2017/0003921 A1* | 1/2017 | Ge | G06F 3/1267 |
| 2017/0289392 A1* | 10/2017 | Hwang | H04N 1/23 |

FOREIGN PATENT DOCUMENTS

| | | | |
|---|---|---|---|
| JP | 2007193407 A | * | 8/2007 |
| JP | 2015-026899 | | 2/2015 |

OTHER PUBLICATIONS

Abstract of Japanese Publication 2007-193407 (English) (Year: 2007).*

* cited by examiner

*Primary Examiner* — Thomas D Lee
(74) *Attorney, Agent, or Firm* — Workman Nydegger

(57) ABSTRACT

A printing system includes a terminal device that generates print job data, and a child printer that is configured to communicate with a parent printer that receives the print job data from the terminal device, where the child printer is configured to perform printing based on the print job data. The terminal device stores the generated print job data and transmits, to the parent printer, print job related data including the stored print job data and a plurality of pieces of access information for accessing the terminal device. The child printer requests a transmission of the print job data from the terminal device based on the plurality of pieces of access information included in the print job related data received by the parent printer.

9 Claims, 5 Drawing Sheets

PRINTING SYSTEM, PRINTING SYSTEM CONTROL METHOD, PRINTING APPARATUS, TERMINAL DEVICE, AND NON-TRANSITORY COMPUTER-READABLE STORAGE MEDIUM STORING PROGRAM FOR CONTROLLING ACCESS TO PRINT JOB DATA ACCESSIBLE FROM THE TERMINAL DEVICE

The present application is based on, and claims priority from JP Application Serial Number 2019-110915, filed Jun. 14, 2019, the disclosure of which is hereby incorporated by reference herein in its entirety.

BACKGROUND

1. Technical Field

The present disclosure relates to a printing system, a printing system control method, a printing apparatus, a terminal device, and a non-transitory computer-readable storage medium storing a program.

2. Related Art

In the related art, a technique is known in which print job data is transmitted and received between a plurality of printing apparatuses, thereby sharing the print job data between the plurality of printing apparatuses without using a server. For example, JP-A-2015-26899 discloses a system in which a certain printing apparatus receives print job data from a terminal device and stores the received print job data, and another printing apparatus that has performed user authentication receives the print job data from the certain printing apparatus.

In the system as described in JP-A-2015-26899, it is desired that the another printing apparatus different from the printing apparatus storing the print job data be configured to be able to receive the print job data from the terminal device. However, for example, depending on predetermined factors such as a network configuration between the another printing apparatus and the terminal device, and the type of access information for accessing the terminal device, the another printing apparatus may not access the terminal device and may not receive print job data from the terminal device.

SUMMARY

According to an aspect of the present disclosure, a printing system includes a terminal device that generates print job data, and a second printing apparatus configured to communicate with a first printing apparatus that receives the print job data from the terminal device, where the second printing apparatus is configured to perform printing based on the print job data, wherein the terminal device stores the generated print job data and transmits, to the first printing apparatus, first data including the stored print job data and a plurality of pieces of access information for accessing the terminal device, and wherein the second printing apparatus requests a transmission of the print job data from the terminal device based on the plurality of pieces of access information included in the first data received by the first printing apparatus.

In the above printing system, the second printing apparatus may receive second data including the plurality of the access information from the first printing apparatus, may select the access information from the plurality of pieces of access information included in the received second data, and may request a transmission of the print job data from the terminal device based on the selected access information.

In the above printing system, the access information may include an IP address, and wherein the second printing apparatus preferentially may select the access information including an IP address closer to an IP address of the second printing apparatus.

In the above printing system, the second printing apparatus may store the access information with which the second printing apparatus accessed the terminal device in the past, and may preferentially select the access information identical to the stored access information.

In the above printing system, the second printing apparatus may receive the print job data from the first printing apparatus when failing to receive, from the terminal device, the print job data due to a transmission request, and may perform printing based on the received print job data.

The above printing system may include the first printing apparatus, wherein the first printing apparatus may select the access information from the plurality of pieces of access information included in the first data received from the terminal device, and may transmit second data including the selected access information to the second printing apparatus, and wherein the second printing apparatus may receive the second data from the first printing apparatus, and may request a transmission of the print job data from the terminal device based on the access information included in the received second data.

In the above printing system, the plurality of pieces of access information may include temporary access information that is access information with which the terminal device is configured to be temporarily accessed and the access information other than the temporary access information.

According to another aspect of the present disclosure, in a method of controlling a printing system including a terminal device that generates print job data, and a second printing apparatus configured to communicate with a first printing apparatus that receives the print job data from the terminal device, where the second printing apparatus is configured to perform printing based on the print job data includes, the method includes the terminal device storing the generated print job data and transmitting, to the first printing apparatus, first data including the stored print job data and a plurality of pieces of access information for accessing the terminal device, and the second printing apparatus requesting a transmission of the print job data from the terminal device based on the plurality of pieces of access information included in the first data received by the first printing apparatus.

According to still another aspect of the present disclosure, a printing apparatus configured to communicate with another printing apparatus that receives, from a terminal device, first data including print job data and a plurality of pieces of access information for accessing the terminal device, where the printing apparatus is configured to perform printing based on the print job data, includes a printing apparatus communication unit, and a printing apparatus controller that controls the printing apparatus communication unit, wherein the printing apparatus controller causes the printing apparatus communication unit to request a transmission of the print job data from the terminal device based on the plurality of pieces of access information included in the first data received by the another printing apparatus.

According to still another aspect of the present disclosure, a terminal device that generates print job data includes a storage unit that stores the print job data, a terminal communication unit, and a terminal controller that controls the terminal communication unit, wherein the terminal controller causes the terminal communication unit to transmit, to a first printing apparatus, first data including print job data stored in the storage unit and a plurality of pieces of access information for accessing the terminal device, and causes the terminal communication unit to transmit the print job data to a second printing apparatus when the second printing apparatus requests a transmission of the print job data based on the plurality of pieces of access information included in the first data transmitted to the first printing apparatus.

According to still another aspect of the present disclosure, in a non-transitory computer-readable storage medium storing a program, where the program causes a terminal controller of a terminal device that generates print job data to execute a method, the method includes storing the generated print job data, transmitting, to a first printing apparatus, first data including the stored print job data and a plurality of pieces of access information for accessing the terminal device, and transmitting the print job data to a second printing apparatus when the second printing apparatus requests a transmission of the print job data based on the plurality of pieces of access information included in the first data transmitted to the first printing apparatus.

DESCRIPTION OF EXEMPLARY EMBODIMENTS

Figure 1:
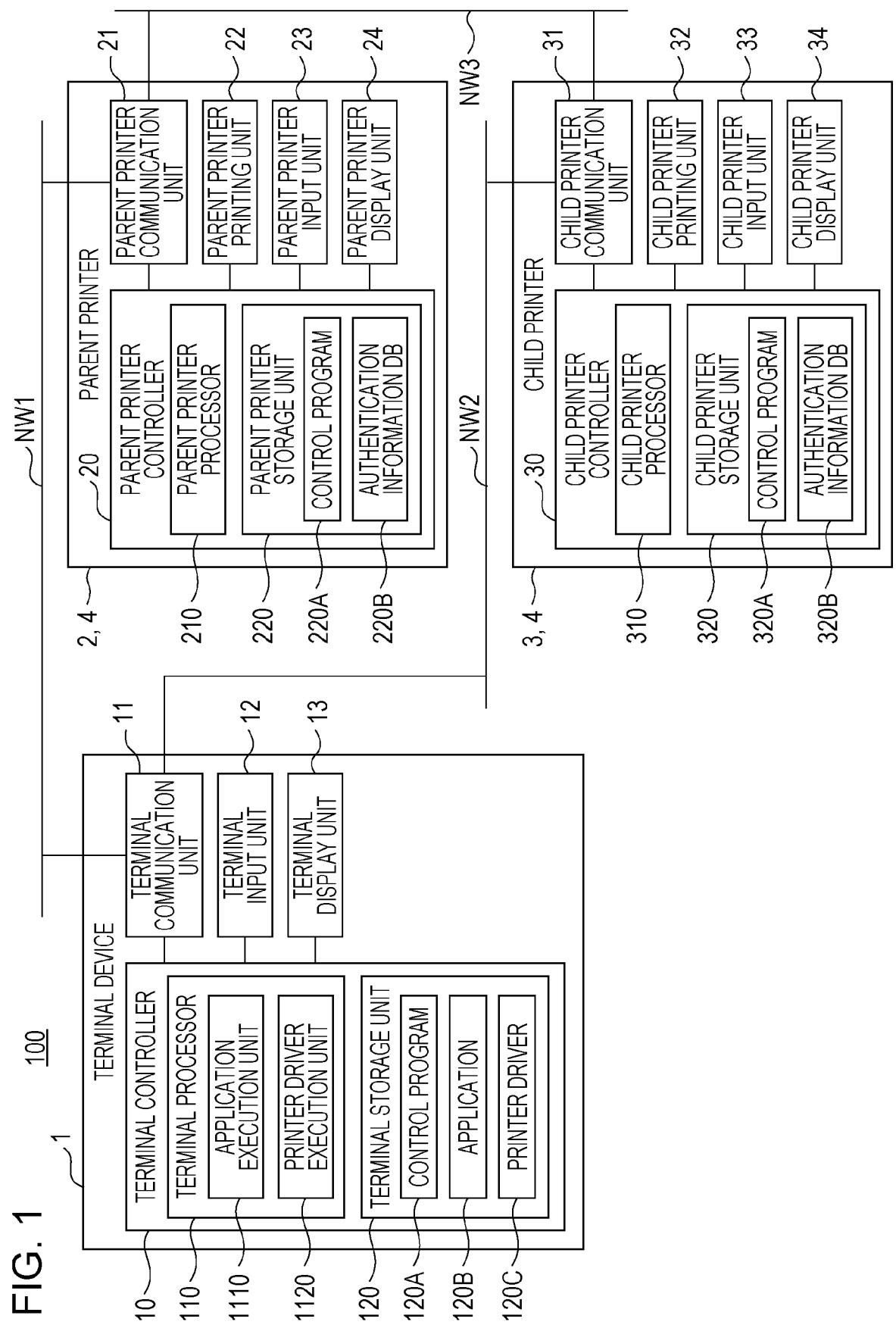
FIG. 1 is a diagram illustrating an example of a network configuration of respective devices included in a printing system.

FIG. 1 is a diagram illustrating an example of a network configuration of respective devices included in a printing system 100. As shown in FIG. 1, the printing system 100 includes a terminal device 1, a parent printer 2, and a child printer 3. The parent printer 2 corresponds to an example of a first printing apparatus and another printing apparatus. The child printer 3 corresponds to an example of a second printing apparatus and a printing apparatus.

In the following description, when the parent printer 2 and the child printer 3 are not distinguished from each other, they are referred to as the "printer" and are denoted by a reference numeral "4".

The printing system 100 has an authentication printing function. The authentication printing means that a printer 4 receives an operation related to the user authentication from the user, the printer 4 performs user authentication based on the received operation related to the user authentication, and when the user authentication has succeeded, the printer 4 that has performed the user authentication prints printed matter based on a print job desired by the user. As a result, in the printing system 100, it is possible to prevent the printer 4 installed at a location remote from the user from printing printed matter based on the print job desired by the user, and information printed on the printed matter from leaking to another person. Further, since any printer 4 can perform printing of the printed matter based on the print job desired by the user, the printing system 100 is highly convenient for the user.

In the present embodiment, one print job refers to a series of operations for printing one piece or a plurality of pieces of printed matter. In the case of printing a plurality of pieces of printed matter, one print job refers to a series of operations for printing the printed matter having the same print content. For example, when printing ten sheets of the printed matter having the same content, one print job refers to a series of operations for printing ten sheets of the printed matter.

The terminal device 1 is a personal computer (PC). The terminal device 1 may be a laptop type computer, a tablet type computer, or a desktop type computer. The terminal device 1 generates print job data that is data for executing a print job, and transmits the generated print job data to the parent printer 2. As will be described later, when the terminal device 1 has been accessed by the child printer 3, the terminal device 1 transmits the print job data to the child printer 3 that has accessed the terminal device 1.

The parent printer 2 is a device that prints printed matter, receives the print job data generated by the terminal device 1, and stores the received print job data in a storage means such as a parent printer storage unit 220 described later. When receiving an operation related to user authentication, the parent printer 2 performs user authentication based on the received operation related to the user authentication. When the user authentication has succeeded, the parent printer 2 prints the printed matter based on the print job data of the print job desired by the user of the stored print job data. When receiving a print job data transmission request from the child printer 3, the parent printer 2 transmits, to the requesting child printer 3, the requested print job data from the print job data received from the terminal device 1.

The child printer 3 is a device that prints the printed matter. The child printer 3 receives an operation related to user authentication, and performs user authentication based on the received operation related to the user authentication. When the user authentication has succeeded, the child printer 3 requests a transmission of print job data of a print job desired by the user from the terminal device 1, or the terminal device 1 and the parent printer 2, and receives the print job data from the terminal device 1 or the parent printer 2. Then, the child printer 3 prints the printed matter based on the print job desired by the user based on the received print job data. Unlike the parent printer 2, the child printer 3 cannot receive the print job data from the terminal device 1 unless requesting a transmission from the terminal device 1.

In the printing system 100, one printer 4 accessed first by the terminal device 1 functions as the parent printer 2, and another printer 4 functions as the child printers 3. However, a method of determining the parent printer 2 is not limited to this. For example, the user may set the parent printer 2, or may set the printer 4 activated first as the parent printer 2.

As shown in FIG. 1, the terminal device 1 and the parent printer 2 are connected to a first network NW1. Further, the terminal device 1 and the child printer 3 are connected to a second network NW2. Further, the parent printer 2 and the child printer 3 are connected to a third network NW3. The first network NW1, the second network NW2, and the third network NW3 may be a network constructed by a virtual line such as a virtual private network (VPN), or may be a network constructed by a physical line. The first network NW1, the second network NW2, and the third network NW3 may be a network that includes one or more intermediate network devices.

Figure 2:
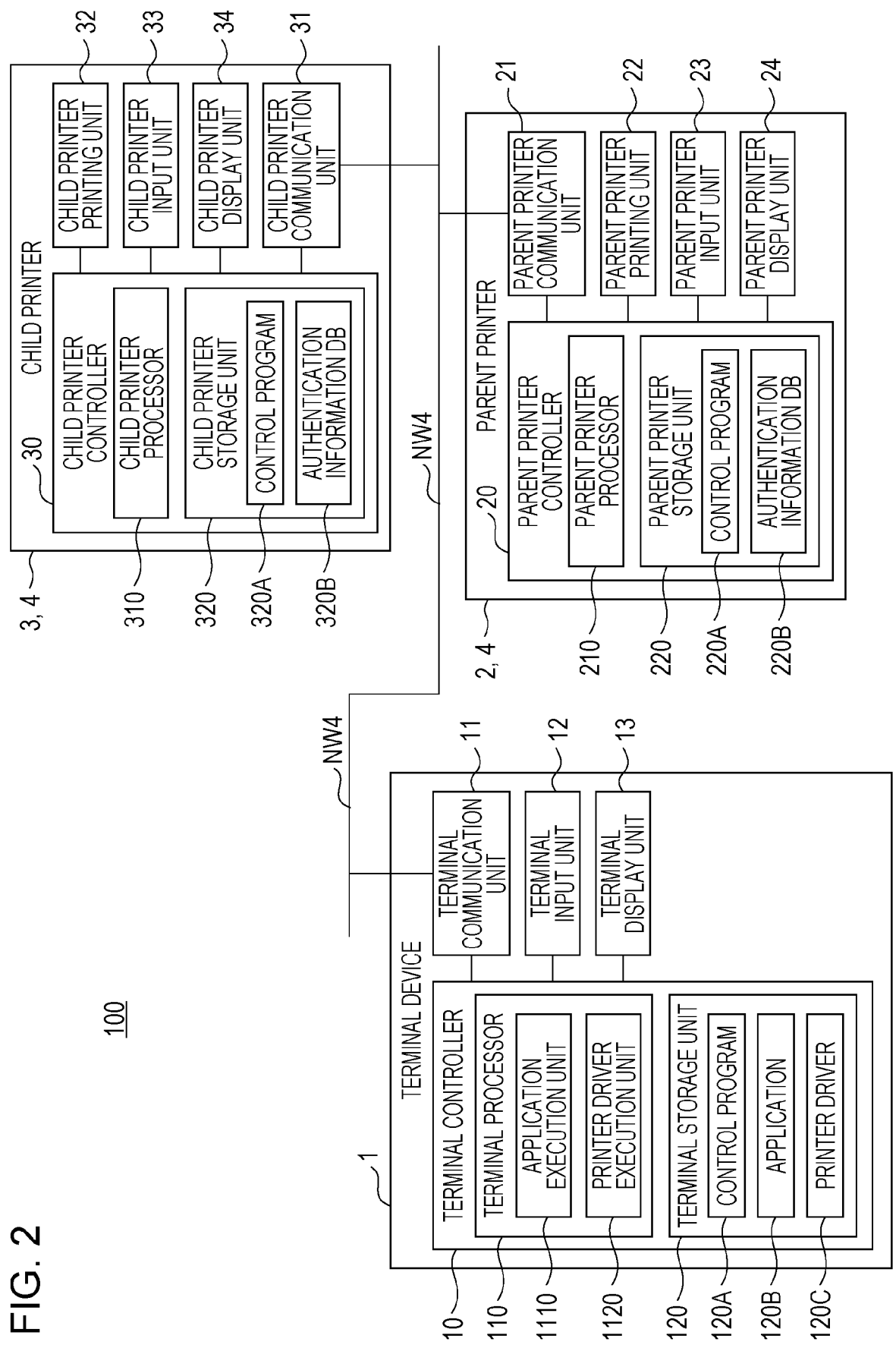
FIG. 2 is a diagram illustrating an example of a network configuration of respective devices included in the printing system.

FIG. 2 is a diagram illustrating an example of a network configuration of respective devices included in the printing system 100. In the network configuration shown in FIG. 2, the terminal device 1, the parent printer 2, and the child printer 3 are connected to a fourth network NW4. Note that the fourth network NW4 may be a network constructed by a virtual line or a network constructed by a physical line. Further, the fourth network NW4 may be a network that includes one or more relay network devices.

In FIGS. 1 and 2, although the case where the printing system 100 includes one child printer 3 is illustrated, the number of child printers 3 included in the printing system 100 is not limited to one, but may be plural. In FIGS. 1 and 2, although the case where the printing system 100 includes one terminal device 1 is illustrated, the number of terminal devices 1 included in the printing system 100 is not limited to one, but may be plural.

As shown in FIGS. 1 and 2, the terminal device 1 includes a terminal controller 10, a terminal communication unit 11, a terminal input unit 12, and a terminal display unit 13.

The terminal controller 10 includes a terminal processor 110 that is a processor, such as a CPU and an MPU, which executes programs, and a terminal storage unit 120, and controls respective units of the terminal device 1. The terminal storage unit 120 corresponds to an example of a storage unit. The terminal controller 10 performs various processes in cooperation with hardware and software so that the terminal processor 110 reads a control program 120A stored in the terminal storage unit 120 and executes the processes. The terminal processor 110 functions as an application execution unit 1110 by executing an application 120B stored in the terminal storage unit 120. The terminal processor 110 functions as a printer driver execution unit 1120 by executing a printer driver 120C stored in the terminal storage unit 120. The printer driver 120C corresponds to an example of a program.

The terminal storage unit 120 has a storage area for storing a program to be executed by the terminal processor 110 and data processed by the terminal processor 110. The terminal storage unit 120 stores the control program 120A, the application 120B, the printer driver 120C, and other various pieces of data executed by the terminal processor 110. The terminal storage unit 120 has a nonvolatile storage area for storing programs and data in a nonvolatile manner. Further, the terminal storage unit 120 may include a volatile storage area, and may constitute a work area for temporarily storing a program to be executed by the terminal processor 110 and data to be processed.

The terminal communication unit 11 includes communication hardware according to a predetermined communication standard, and communicates with a device connected to a network under the control of the terminal controller 10. In the case of the network configuration shown in FIG. 1, the terminal communication unit 11 communicates with the parent printer 2 connected to the first network NW1 and the child printer 3 connected to the second network NW2 under the control of the terminal controller 10. In the case of the network configuration shown in FIG. 2, the terminal communication unit 11 communicates with the parent printer 2 and the child printer 3 connected to the fourth network NW4 under the control of the terminal controller 10.

The terminal input unit 12 includes an operation switch provided on the terminal device 1 and input means such as a touch panel, a mouse, a keyboard, and the like, detects a user interaction with the input means, and outputs the detection result to the terminal controller 10. The terminal controller 10 performs a process corresponding to an operation on the input means based on an input from the terminal input unit 12.

The terminal display unit 13 includes an LED, a display panel, and the like, and performs lighting/flashing/extinguishing of the LED in a predetermined mode, display of information on the display panel, and the like under the control of the terminal controller 10.

Next, the configuration of the parent printer 2 will be described. The parent printer 2 includes a parent printer controller 20, a parent printer communication unit 21, a parent printer printing unit 22, a parent printer input unit 23, and a parent printer display unit 24.

The parent printer controller 20 includes a parent printer processor 210, which is a processor, such as a CPU and an MPU, which executes programs, and the parent printer storage unit 220, and controls respective units of the parent printer 2. The parent printer controller 20 performs various processes in cooperation with hardware and software so that the parent printer processor 210 reads a control program 220A stored in the parent printer storage unit 220 and executes the processes.

The parent printer storage unit 220 has a storage area for storing a program to be executed by the parent printer processor 210 and data processed by the parent printer processor 210. The parent printer storage unit 220 stores the control program 220A executed by the parent printer processor 210, an authentication information DB 220B, and other various pieces of data. The authentication information DB 220B is a database that stores, in an updatable manner, authentication information of a user who can print printed matter by the printer 4 included in the printing system 100. The authentication information is identification information for identifying a user who uses authentication printing. The authentication information is assigned in advance to a user who is qualified to use authentication printing in the printing system 100.

The parent printer storage unit 220 has a nonvolatile storage area for storing programs and data in a nonvolatile manner. Further, the parent printer storage unit 220 may include a volatile storage area, and may constitute a work area for temporarily storing a program to be executed by the parent printer processor 210 and data to be processed.

The parent printer communication unit 21 includes communication hardware according to a predetermined communication standard, and communicates with a device connected to a network under the control of the parent printer controller 20. In the network configuration shown in FIG. 1, the parent printer communication unit 21 communicates with the terminal device 1 connected to the first network NW1 and the child printer 3 connected to the third network NW3 under the control of the parent printer controller 20. In the network configuration shown in FIG. 2, the parent printer communication unit 21 communicates with the terminal device 1 and the child printer 3 connected to the fourth network NW4 under the control of the parent printer controller 20.

The parent printer printing unit 22 has a configuration related to printing in which an ink jet head that forms dots by ejecting ink on a print medium, a carriage for operating the ink jet head in the scanning direction, a carriage drive motor for driving the carriage, a transport unit for transporting a print medium, an ink supply unit for supplying ink to the ink jet head, and the like are provided. The parent printer printing unit 22 prints printed matter based on the print job data received from the terminal device 1 under the control of the parent printer controller 20.

The parent printer input unit 23 includes an operation switch provided on the parent printer 2 and an input means such as a touch panel, detects a user interaction with the input means, and outputs the detection result to parent printer controller 20. The parent printer input unit 23 of the present embodiment includes an input means for a user to input authentication information to the parent printer 2. An example of the input means includes a card reader that reads an IC card or the like that stores user authentication information. In addition, the authentication method is not limited to this. The user may input authentication information such as a user ID and a password into the operation switch or the touch panel, or fingerprint authentication or the like may be used. The parent printer controller 20 performs a process corresponding to an operation on the input means based on an input from the parent printer input unit 23.

The parent printer display unit 24 includes an LED, a display panel, and the like, and performs lighting/flashing/extinguishing of the LED in a predetermined mode, display of information on the display panel, and the like under the control of the parent printer controller 20.

Next, the configuration of the child printer 3 will be described. The child printer 3 includes a child printer controller 30, a child printer communication unit 31, a child printer printing unit 32, a child printer input unit 33, and a child printer display unit 34. The child printer controller 30 corresponds to an example of a printing apparatus controller. The child printer communication unit 31 corresponds to an example of a printing apparatus communication unit.

The child printer controller 30 includes a child printer processor 310, which is a processor, such as a CPU and an MPU, which executes programs, and a child printer storage unit 320, and controls respective units of the child printer 3. The child printer controller 30 performs various processes in cooperation with hardware and software so that the child printer processor 310 reads a control program 320A stored in the child printer storage unit 320 and executes the processes.

The child printer storage unit 320 has a storage area for storing a program to be executed by the child printer processor 310 and data processed by the child printer processor 310. The child printer storage unit 320 stores the control program 320A executed by the child printer processor 310, an authentication information DB 320B, and other various pieces of data. The authentication information DB 320B is the same database as the authentication information DB 220B stored in the parent printer 2.

The child printer storage unit 320 has a nonvolatile storage area for storing programs and data in a nonvolatile manner. Further, the child printer storage unit 320 may include a volatile storage area, and may constitute a work area for temporarily storing a program to be executed by the child printer processor 310 and data to be processed.

The child printer communication unit 31 includes communication hardware according to a predetermined communication standard, and communicates with a device connected to a network under the control of the child printer controller 30. In the network configuration shown in FIG. 1, the child printer communication unit 31 communicates with the terminal device 1 connected to the second network NW2 and the parent printer 2 connected to the third network NW3 under the control of the child printer controller 30. In the network configuration shown in FIG. 2, the child printer communication unit 31 communicates with the terminal device 1 and the parent printer 2 connected to the fourth network NW4 under the control of the child printer controller 30.

The child printer printing unit 32 has a configuration related to printing system in which an ink jet head that forms dots by ejecting ink on a print medium, a carriage for operating the ink jet head in the scanning direction, a carriage drive motor for driving the carriage, a transport unit for transporting a print medium, an ink supply unit for supplying ink to the ink jet head, and the like are provided. The child printer printing unit 32 prints printed matter based on the print job data received from the terminal device 1 or the parent printer 2 under the control of the child printer controller 30.

The child printer input unit 33 includes an operation switch provided on the child printer 3 and an input means such as a touch panel, and detects user interaction with the input means, outputs the detection result to the child printer controller 30. As in the parent printer 2, the child printer input unit 33 of the present embodiment includes the input means for a user to input authentication information to the child printer 3. The child printer controller 30 performs a process corresponding to an operation on the input means based on an input from the child printer input unit 33.

The child printer display unit 34 includes an LED, a display panel, and the like, and performs lighting/flashing/extinguishing of the LED in a predetermined mode, display of information on the display panel, and the like under the control of the child printer controller 30.

Figure 3A:
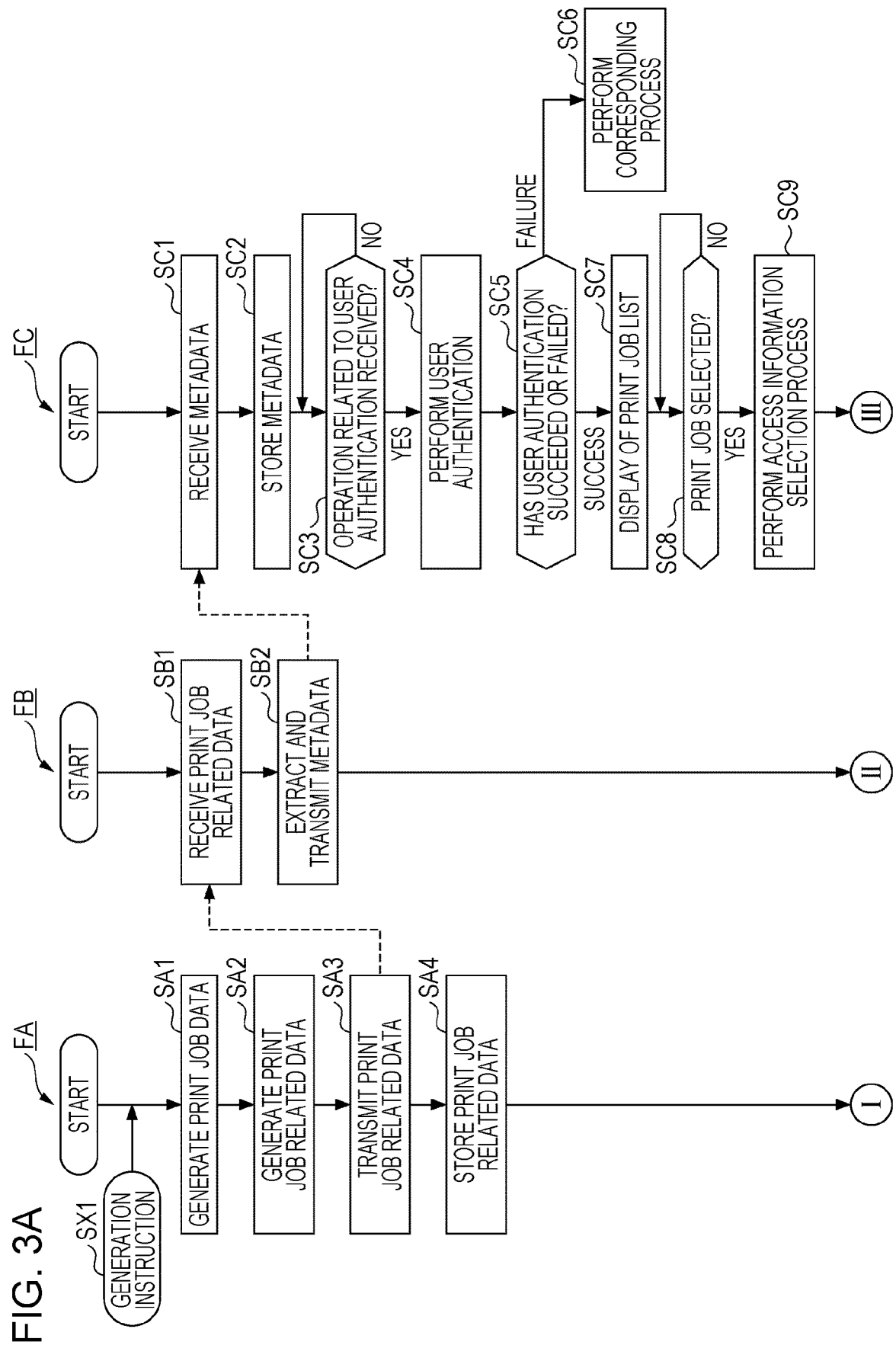
FIG. 3A is a first half of a flowchart illustrating an operation of the printing system.
Figure 3B:
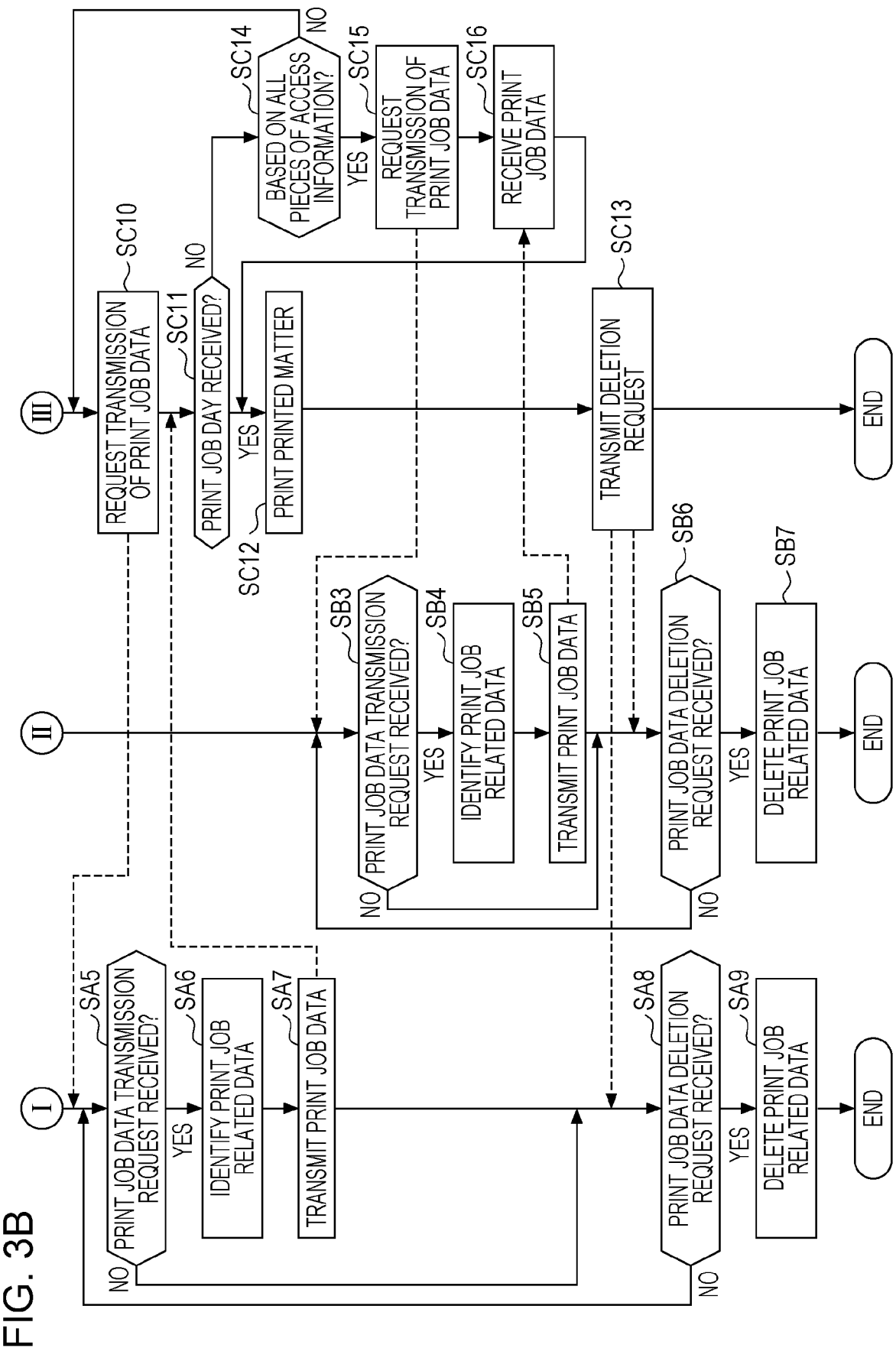
FIG. 3B is a second half of the flowchart illustrating the operation of the printing system.

Next, the operation of the printing system 100 in the authentication printing will be described. FIGS. 3A and 3B are flowcharts illustrating the operation of the printing system 100. In FIGS. 3A and 3B, a flowchart FA indicates an operation of the terminal device 1, a flowchart FB indicates an operation of the parent printer 2, and a flowchart FC indicates an operation of the child printer 3.

In the operation illustrated in FIGS. 3A and 3B, it is assumed that the user prints printed matter based on a desired print job by the child printer 3.

The user operates the terminal device 1 to instruct the terminal device 1 to generate print job data (step SX1). The user inputs authentication information to the terminal device 1 when instructing generation of the print job data.

The printer driver execution unit 1120 of the terminal controller 10 of the terminal device 1 receives the operation of the print job data generation instruction from the terminal input unit 12 to generate the print job data (step SA1).

Here, generation of the print job data will be described. The application execution unit 1110 of the terminal controller 10 uses the function of the application 120B installed in the terminal device 1 in advance to generate image data of an image to be printed by the printer 4 based on an operation by the user on the terminal device 1.

The printer driver execution unit 1120 uses the function of the printer driver 120C installed in the terminal device 1 in advance to generate the print job data based on the image data generated by the application execution unit 1110. The print job data includes image data generated by the application execution unit 1110, various commands for printing the image indicated by the image data, information indicating the number of sheets of the printed matter, and the like. Note that various commands included in the print job data are commands corresponding to the command specifications of the printer 4.

Next, the printer driver execution unit 1120 generates print job related data based on the generated print job data (step SA2).

The print job related data corresponds to an example of the first data. The print job related data includes the generated print job data, identification information for identifying the print job, a plurality of pieces of access information for accessing the terminal device 1, authentication information input to the terminal device 1 by the user, and the like.

In the present embodiment, one pieced of access information included in the print job related data indicates a combination of one IP address assigned to the terminal device 1 and one port number. Thus, in the plurality of pieces of access information included in the print job related data, the port numbers are combined one by one for all the respective IP addresses assigned to the terminal devices 1. The plurality of pieces of access information included in the print job related data has different IP addresses and port numbers with each other.

When the terminal device 1 communicates with a device connected to the network using an IPv6 protocol, the plurality of pieces of access information included in the print job data includes at least temporary access information that is access information with which the terminal device 1 can be temporarily accessed, and normal access information which is, unlike the temporary access information, access information having no time restriction in access. The temporary access information is a combination of a temporary IPv6 address and a port number.

After generating the print job related data, the printer driver execution unit 1120 causes the terminal communication unit 11 to transmit the generated print job related data to the parent printer 2 (step SA3). Note that the IP address of the parent printer 2 is registered in the terminal device 1 in advance.

Next, the printer driver execution unit 1120 stores, in the terminal storage unit 120, the print job related data transmitted to the parent printer 2 by the terminal communication unit 11 (step SA4).

Referring to the flowchart FB, the parent printer controller 20 of the parent printer 2 causes the parent printer communication unit 21 to receive the print job related data from the terminal device 1 (step SB1).

Next, the parent printer controller 20 extracts metadata from the received print job related data to cause the parent printer communication unit 21 to transmit the extracted metadata to the child printer 3 (step SB2). While the number of the child printers 3 connected to the third network NW3 and the fourth network NW4 is one in FIGS. 1 and 2, when the number of the child printers 3 is plural, the metadata is transmitted to all the child printers 3.

The metadata corresponds to an example of second data. The metadata extracted from the print job related data includes at least a plurality of pieces of access information, identification information for identifying the print job, and authentication information. Since the metadata does not include the print job data, the data amount is reduced, compared with the print job related data. Therefore, the parent printer controller 20 can reduce the amount of data transmitted to the child printer 3. The data included in the metadata is only an example, and may include other data as long as it does not include the print job data, and the metadata has a smaller data amount than the print job related data.

Next, the child printer controller 30 of the child printer 3 causes the child printer communication unit 31 to receive the metadata (step SC1).

Next, the child printer controller 30 stores the received metadata in the child printer storage unit 320 (step SC2).

Next, the child printer controller 30 determines whether the child printer input unit 33 has received an operation related to user authentication (step SC3).

When determining that the child printer input unit 33 has received the operation related to user authentication (step SC3: YES), the child printer controller 30 performs the user authentication based on the authentication information input by the user (step SC4).

In step SC4, the child printer controller 30 refers to the authentication information DB 320B to determine whether the authentication information input by the user is stored in the authentication information DB 320B.

The child printer controller 30 determines whether the user authentication has succeeded or failed in step SC4 (step SC5). When the authentication information input by the user is stored in the authentication information DB 320B, the child printer controller 30 determines that the user authentication has succeeded, and when not stored in the authentication information DB 320B, the child printer controller 30 determines that the user authentication has failed.

When determining that the user authentication has failed (step SC5: failure), the child printer controller 30 performs a corresponding process (step SC6). An example of the corresponding process includes a process of making a notification that the user authentication has failed.

On the other hand, when determining that the user authentication has succeeded (step SC5: success), the child printer controller 30 causes the child printer display unit 34 to selectably display a list of the print jobs corresponding to the authentication information for which the user authentication has succeeded based on the metadata stored in the child printer storage unit 320 (step SC7).

For example, in step SC7, the child printer 3 identifies metadata including the authentication information when the user authentication has succeeded from the metadata stored in the child printer storage unit 320 to selectably display a list of the print job identification information included in the identified metadata.

Next, the child printer controller 30 determines whether one print job has been selected from the list of the print jobs displayed by the child printer display unit 34 (step SC8).

When determining that one print job has been selected from the list of print jobs displayed by the child printer display unit 34 (step SC8: YES), the child printer controller 30 performs an access information selection process for selecting a predetermined number of pieces of access information from a plurality of pieces of access information included in the metadata corresponding to the selected print job (step SC9). In the present embodiment, the number of pieces of access information selected by the access information selection process is one or more, and smaller than the number of pieces of access information included in the metadata.

Here, the selection process in step SC9 will be described. The child printer controller 30 preferentially selects the access information including an IP address close to an IP address of the child printer 3 from a plurality of pieces of access information included in the metadata by the predetermined number of pieces of access information. For example, the child printer controller 30 compares the numerical sequence of the IP address of the child printer 3 and the numerical sequences of the IP addresses of the access information included in the metadata in order from the beginning to the end. It should be noted that the numerical sequence here indicates at least a sequence composed of numbers, and may be a sequence including characters other than numbers. The child printer controller 30 performs this comparison for all pieces of access information included in the metadata. Then, the child printer controller 30 selects a predetermined number of pieces of access information from the plurality of pieces of access information included in the metadata in descending order of the number of matching numerical values.

The child printer controller 30 causes the child printer communication unit 31 to requests a transmission of the print job data based on the access information selected in the access information selection process in step SC9 (step SC10). The print job data transmission request includes identification information for identifying the print job selected by the user.

Referring to the flowchart FA, the printer driver execution unit 1120 of the terminal controller 10 of the terminal device 1 determines whether the terminal communication unit 11 has received a print job data transmission request from the child printer 3 (step SA5).

When determining that the print job data transmission request has not been received from the child printer 3 (step SA5: NO), the printer driver execution unit 1120 advances the process to step SA8.

On the other hand, when determining that the print job data transmission request has been received from the child printer 3 (step SA5: YES), the printer driver execution unit 1120 identifies the print job related data corresponding to the print job identification information included in the transmission request from the terminal storage unit 120 (step SA6).

Then, the printer driver execution unit 1120 causes the terminal communication unit 11 to transmit the print job data included in the identified print job related data to the child printer 3 (step SA7). The printer driver execution unit 1120 performs the process of step SA7 based on the IP address of the child printer 3 included in the transmission request packet received from the child printer 3.

Referring to the flowchart FC, the child printer controller 30 determines whether the child printer communication unit 31 has received the print job data from terminal device 1 (step SC11).

When determining that the print job data has been received from the terminal device 1 (step SC11: YES), the child printer controller 30 causes the child printer printing unit 32 to print the printed matter based on the received print job data (step SC12).

When the printing based on the print job data is completed, the child printer controller 30 causes the child printer communication unit 31 to transmit a request for deleting the print job related data to the terminal device 1 and the parent printer 2 (step SC13). This deletion request includes the identification information of the print job for which printing has been completed.

On the other hand, when determining that the print job data has not been received from the terminal device 1 (step SC11: NO), the child printer controller 30 determines whether the transmission of print job data has been requested based on all the pieces of access information selected in the access information selection process (step SC14).

When determining that the transmission of print job data is not requested based on all the pieces of access information selected in the access information selection process (step SC14: NO), the child printer controller 30 returns the process to step SC10.

On the other hand, when determining that the transmission of print job data has been requested based on all the pieces of access information selected in the access information selection process (step SC14: YES), the child printer controller 30 causes the child printer communication unit 31 to request the transmission of the print job data from the parent printer 2 (step SC15). Note that, similarly to the transmission request transmitted to the terminal device 1, the transmission request transmitted to the parent printer 2 includes the identification information for identifying the print job selected by the user.

Referring to the flowchart FB, the parent printer controller 20 of the parent printer 2 determines whether a print job data transmission request has been received from the child printer 3 (step SB3).

When determining that the print job data transmission request has not been received from the child printer 3 (step SB3: NO), the parent printer controller 20 advances the process to step SB6.

When determining that the print job data transmission request has been received from the child printer 3 (step SB3: YES), the parent printer controller 20 identifies the print job related data corresponding to the identification information of the print job included in the transmission request from the parent printer storage unit 220 (step SB4).

Then, the parent printer controller 20 causes the parent printer communication unit 21 to transmit the print job data included in the identified print job related data to the child printer 3 (step SB5).

Referring to the flowchart FC, when receiving the print job data from the parent printer 2 (step SC16), the child printer controller 30 prints the printed matter based on the received print job data (step SC12). Then, when the printing is completed, the child printer controller 30 transmits the request for deleting the print job related data to the terminal device 1 and the parent printer 2 (step SC13).

Referring to the flowchart FA, the printer driver execution unit 1120 of the terminal controller 10 of the terminal device 1 determines whether the terminal communication unit 11 has received the request for deleting the print job related data (step SA8).

When determining that the request for deleting the print job related data has not been received (step SA8: NO), the printer driver execution unit 1120 returns the process to step SA5.

On the other hand, when determining that the request for deleting the print job related data has been received (step SA8: YES), the printer driver execution unit 1120 deletes, from the terminal storage unit 120, the print job related data corresponding to the print job identification information included in the deletion request (step SA9).

Also, referring to the flowchart FB, the parent printer controller 20 of the parent printer 2 determines whether the parent printer communication unit 21 has received the request for deleting the print job related data (step SB6).

When determining that the request for deleting the print job related data has not been received (step SB6: NO), the parent printer controller 20 returns the process to step SB3.

On the other hand, when determining that the request for deleting the print job related data has been received (step SB6: YES), the parent printer controller 20 deletes, from the parent printer storage unit 220, the print job related data corresponding to the print job identification information included in the deletion request (step SB7).

The effects of the operation shown in FIGS. 3A and 3B will be described. As described above, when the user authentication has succeeded, the child printer 3 first requests a transmission of the print job data from the terminal device 1 not from the parent printer 2. This is because when a transmission request is issued to the parent printer 2 while the parent printer 2 is performing an operation such as printing, the processing load of the parent printer 2 increases, and the transmission performance of the print job data decreases, so that it takes time for the child printer 3 to receive the print job data. That is, the child printer 3 first requests a transmission of the print job data from the terminal device 1 so that the printing performance does not deteriorate.

In the related art, the child printer 3 acquires, from the parent printer 2, the access information of the terminal device 1 used for communication between the terminal device 1 and the parent printer 2, and the child printer 3 requests a transmission of the print job data from the terminal device 1 based on the acquired access information. However, as shown in FIG. 1, when the child printer 3 does not exist in the first network NW1 to which the terminal device 1 and the parent printer 2 are connected, the child printer 3 cannot request a transmission of the print job data from terminal device 1 based on the access information, of the terminal device 1, used for communication by the terminal device 1 and the parent printer 2.

Therefore, as described above, the terminal device 1 transmits, to the parent printer 2, a plurality of pieces of access information for accessing the terminal device 1. Then, the child printer 3 requests a transmission of the print job data from the terminal device 1 based on the plurality of pieces of access information received by the parent printer 2. As a result, as shown in FIG. 1, even when the child printer 3 does not exist in the first network NW1 to which the terminal device 1 and the parent printer 2 are connected, the possibility that the child printer 3 can request a transmission of the print job data from the terminal device 1 using the access information with which the child printer 3 can access the terminal device 1 increases. In the case of FIG. 1, the child printer 3 can request a transmission of the print job data from the terminal device 1 using the access information of the terminal device 1 in the second network NW2. Therefore, by performing the operation of FIGS. 3A and 3B, as shown in FIG. 1, even when the child printer 3 does not exist in the first network NW1 to which the terminal device 1 and the parent printer 2 are connected, the possibility that the child printer 3 can receive the print job data from the terminal device 1 increases.

Here, as shown in FIG. 2, even when the terminal device 1, the parent printer 2, and the child printer 3 are connected to the fourth network NW4, in some cases, the child printer 3 cannot request a transmission of print job data from the terminal device 1. In this case, for example, the terminal device 1 uses the temporary access information when the terminal device 1 transmits the print job related data to the parent printer 2. When the child printer 3 is connected to the network to which the parent printer 2 and the terminal device 1 are connected, the child printer 3 can access the terminal device 1 by acquiring the temporary access information from the parent printer 2. However, the temporary access information is access information having restriction of the time during which the terminal device 1 can be accessed. For this reason, depending on the timing at which the child printer 3 requests a transmission of the print job data from the terminal device 1 using the temporary access information, the temporary access information may be invalid, so that in some cases, the child printer 3 cannot request a transmission from the terminal device 1.

Therefore, as described above, the terminal device 1 transmits a plurality of pieces of access information including the temporary access information and the normal access information to the parent printer 2. Then, the child printer 3 requests a transmission of the print job data from the terminal device 1 based on the plurality of pieces of access information received by the parent printer 2. As a result, since the child printer 3 can request a transmission of the print job data from the terminal device 1 with access information other than the temporary access information, even when the terminal device 1 and the parent printer 2 communicate with each other using the temporary access information, the possibility that the child printer 3 can receive the print job data from the terminal device 1 increases.

As mentioned above, the child printer 3 requests a transmission of the print job data from the terminal device 1 based on the plurality of pieces of access information, it is possible to increase the possibility that the child printer 3 can request a transmission using the access information with which the child printer 3 can access the terminal device 1. Therefore, it is possible to increase the possibility that the child printer 3 can receive the print job data from the terminal device 1.

Next, a plurality of modifications of the present embodiment will be described.

First Modification

The first modification is different from the above-described embodiment in the processing content of the access information selection process. In the first modification, the child printer controller 30 transmits a predetermined packet to the terminal device 1 based on each of the plurality of pieces of access information included in the metadata to make a response request, and selects the access information responding fastest from a plurality of pieces of access information included in the metadata. According to the first modification, it is possible to increase the possibility that the child printer 3 can receive the print job data from the terminal device 1, and it is possible to prevent that it takes time to receive the print job data and to suppress a decrease in the printing performance of the child printer 3.

Second Modification

As in the first modification, the second modification differs from the above-described embodiment in the processing content of the access information selection process. In the second modification, the child printer controller 30 transmits a predetermined packet for each piece of the access information included in the metadata, makes a response request, and measures a response time. Then, the child printer controller 30 selects a predetermined number of pieces of access information from the plurality of pieces of access information included in the metadata in ascending order of the measured response time. The second modification exerts the same effect as the first modification.

Third Modification

As in the first modification and the second modification, the third modification differs from the above-described embodiment in the processing content of the access information selection process. In the third modification, the child printer controller 30 transmits a predetermined packet for each piece of the access information included in the metadata, and acquires the number of hops between the child printer 3 and the terminal device 1. Then, the child printer controller 30 selects a predetermined number of pieces of access information from the plurality of pieces of access information included in the metadata in ascending order of the number of acquired hops. The smaller the number of hops, the less time it takes for the child printer 3 to receive the print job data, and thus the third modification exerts the same effect as the first modification and the second modification.

Fourth Modification

As in the first modification, the second modification, and the third modification, the fourth modification differs from the above-described embodiment in the processing content of the access information selection process. In the fourth modification, the child printer storage unit 320 stores access information of the terminal device 1 that was accessed in the past. The child printer controller 30 preferentially selects the access information stored in the child printer storage unit 320 when the access information stored in the child printer storage unit 320 is included in the plurality of pieces of access information included in the metadata. According to the fourth modification, it is possible to further increase the possibility that the child printer 3 can receive the print job data from the terminal device 1.

Fifth Modification

In the fifth modification, the parent printer 2 performs an access information selection process. When receiving the print job related data from the terminal device 1, the parent printer 2 selects a predetermined number of pieces of access information from a plurality of pieces of access information included in the print job related data. For example, the parent printer 2 preferentially selects access information including an IP address close to an IP address of the child printer 3 in the network to which the terminal device 1 and the child printer 3 are connected from a plurality of pieces of access information included in the print job related data. When the terminal device 1, the parent printer 2, and the child printer 3 are connected to the same network as shown in FIG. 2, the parent printer 2 selects the access information in accordance with the processes of the first modification, the second modification, and the third modification. The parent printer 2 transmits the access information selected in the access information selection process to the child printer 3 with the access information included in the metadata. In the fifth modification, the child printer 3 does not perform the access information selection process.

According to the fifth modification, since the child printer 3 does not request a transmission of the print job data for all the pieces of access information included in the metadata, it is possible to prevent the time until the print job data is received from being prolonged. Therefore, in the fifth modification, it is possible to suppress a decrease in the printing performance of the child printer 3 due to the request of the transmission from the terminal device 1 by the child printer 3.

Sixth Modification

Figure 4:
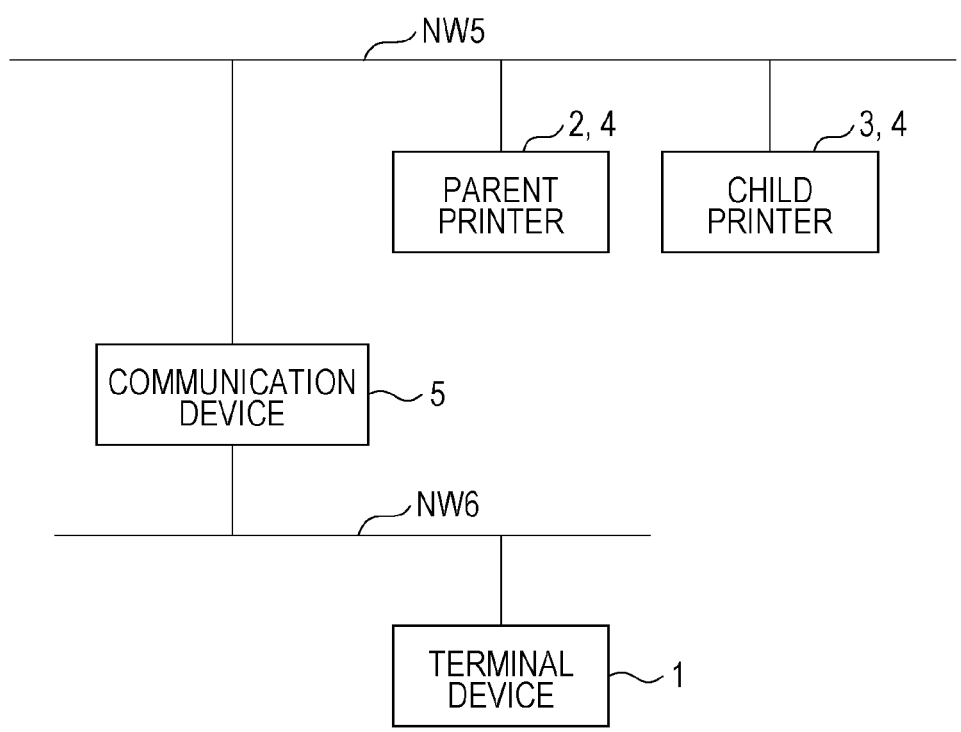
FIG. 4 is a diagram illustrating an example of a network configuration of respective devices included in the printing system.

In the sixth modification, a network configuration as shown in FIG. 4 is assumed. FIG. 4 is a diagram illustrating an example of a network configuration of respective devices included in the printing system 100.

As shown in FIG. 4, the parent printer 2 and the child printer 3 are connected to a fifth network NW5. The terminal device 1 connects to a sixth network NW6. The fifth network NW5 is a network constructed by the Internet or the like. The sixth network NW6 is a local network, and connected to the fifth network NW5 via a communication device 5 having a firewall function and a network address translation (NAT) function. Note that the communication device 5 may have a configuration including a plurality of devices according to functions.

As shown in FIG. 4, when the communication device 5 having the NAT function is provided between the child printer 3 and the terminal device 1, the terminal device 1 transmits, to the parent printer 2, print job related data including a plurality of pieces of access information, of the terminal device 1, converted by the NAT function. The child printer 3 acquires the converted access information of the terminal device 1 from the parent printer 2, requests a transmission of the print job data from the terminal device 1 based on the acquired converted access information of the terminal device 1, and receives the print job data. The communication device 5 is set in advance so that the child printer 3 is not blocked by a firewall function.

In this way, even when the communication device 5 having an address translation function such as a NAT function is provided between the child printer 3 and the terminal device 1, it is possible to increase the possibility that the child printer 3 can receive the print job data from the terminal device 1.

As described above, the printing system 100 includes the terminal device 1 that generates the print job data, and the child printer 3 configured to communicate with the parent printer 2 that receives print job data from the terminal device 1 and configured to perform printing based on print job data. The terminal device 1 stores the generated print job data, and transmits, to the parent printer 2, the print job related data including the stored print job data and a plurality of pieces of access information for accessing the terminal device 1. The child printer 3 requests a transmission of the print job data from the terminal device 1 based on the plurality of pieces of access information included in the print job related data received by the parent printer 2.

In the control method of the printing system 100, the terminal device 1 stores the generated print job data, and transmits, to the parent printer 2, the print job related data including the stored print job data and a plurality of pieces of access information for accessing the terminal device 1. In the control method, the child printer 3 requests a transmission of the print job data from the terminal device 1 based on the plurality of pieces of access information included in the print job related data received by the parent printer 2.

The child printer 3 is configured to communicate with the parent printer 2 that receives, from the terminal device 1, the print job related data including the print job data and the plurality of pieces of access information for accessing the terminal device 1. The child printer 3 includes the child printer communication unit 31 and the child printer controller 30. The child printer controller 30 causes the child printer communication unit 31 to request a transmission of the print job data from the terminal device 1 based on the plurality of pieces of access information included in the print job related data received by the parent printer 2.

The terminal device 1 that generates the print job data includes the terminal storage unit 120 that stores the print job data, the terminal communication unit 11, and the terminal controller 10 that controls the terminal communication unit 11. The terminal controller 10 causes the terminal communication unit 11 to transmit, to the parent printer 2, the print job related data including the print job data stored in the terminal storage unit 120 and the plurality of pieces of access information for accessing the terminal device 1, and causes the terminal communication unit 11 to transmit the print job data to the child printer 3 when the child printer 3 requests a transmission of the print job data based on the plurality of pieces of access information included in the print job related data transmitted to the parent printer 2.

Further, the printer driver 120C causes the terminal controller 10 of the terminal device 1 to store the generated print job data, the stored print job data, to transmit, to the parent printer 2, the print job related data including the plurality of pieces of access information for accessing the terminal device 1, and to transmit the print job data to the child printer 3 when the child printer 3 requests a transmission of the print job data based on a plurality of pieces of access information included in the print job related data transmitted to the parent printer 2.

According to the configuration of the printing system 100, the control method of the printing system 100, the child printer 3, the terminal device 1, and the printer driver 120C, it is possible to increase the possibility that the child printer 3 can requests a transmission of the print job data from the terminal device 1 using the access information with which the child printer 3 can access the terminal device 1. For this reason, according to the configuration of the printing system 100, the control method of the printing system 100, the child printer 3, the terminal device 1, and the printer driver 120C, it is possible to increase the possibility that the child printer 3 can receive the print job data from the terminal device 1. Further, the frequency of the child printer 3 requesting the print job data from the parent printer 2 in authenticated printing can be reduced, and the printing performance of authenticated printing by the child printer 3 can be improved.

The child printer 3 receives metadata including a plurality of pieces of access information from the parent printer 2, selects a piece of access information or a plurality of pieces of access information included in the received metadata, and accesses the terminal device 1 based on the access information selected.

According to this configuration, since the child printer 3 does not request a transmission of the print job data for all the pieces of access information included in the metadata, it is possible to prevent the time until the print job data is received from being prolonged. Therefore, it is possible to suppress a decrease in the printing performance of the child printer 3 due to the request of the transmission from the terminal device 1 by the child printer 3.

The access information includes an IP address. The child printer 3 preferentially selects access information including an IP address closer to an IP address of the child printer 3.

According to this configuration, since the child printer 3 preferentially selects the access information with which the terminal device 1 is likely to be accessed, it is possible to further increase the possibility that the child printer 3 can receive the print job data from the terminal device 1.

The child printer 3 stores access information with which the terminal device 1 was accessed in the past, and preferentially selects the access information identical to the stored access information.

According to this configuration, since it is possible to request a transmission of the print job data using access information with which the terminal device 1 was accessed in the past, it is possible to further increase the possibility that the child printer 3 can receive the print job data from the terminal device 1.

When the child printer 3 cannot receive the print job data from the terminal device 1, it receives the print job data from the parent printer 2 and performs printing based on the received print job data.

According to this configuration, when the print job data cannot be received from the terminal device 1, printing is performed by receiving the print job data from the parent printer 2, so that it is possible to reliably avoid the situation where the child printer 3 cannot receive the print job data.

The printing system 100 includes the parent printer 2. The parent printer 2 selects one or a plurality of pieces of access information from the plurality of pieces of access information included in the print job related data received from the terminal device 1, and transmits the metadata including the selected access information to the child printer 3. The child printer 3 receives the metadata from the parent printer 2 and accesses the terminal device 1 based on the access information included in the received metadata.

According to this configuration, since the child printer 3 does not request a transmission of the print job data for all the pieces of access information included in the metadata, it is possible to prevent the time until the print job data is received from being prolonged. Therefore, it is possible to suppress a decrease in the printing performance of the child printer 3 due to the request of the transmission from the terminal device 1 by the child printer 3.

The plurality of pieces of access information includes temporary access information that is access information with which the terminal device 1 can be temporarily accessed and normal access information other than the temporary access information.

According to this configuration, since the child printer 3 can acquire access information with which the terminal device 1 can be accessed other than the temporary access information, even when the terminal device 1 uses the IPv6 protocol, it is possible to increase the possibility that the child printer 3 can receive the print job data from the terminal device 1.

The embodiments and the modifications described above are merely an aspect of the present disclosure, and any modification and application can be made within the scope of the present disclosure.

For example, in the above-described embodiments and modifications, the printer 4 is exemplified by a serial type ink jet printer, but the printer 4 may be a line type ink jet printer. The printing method of the printer 4 is not limited to the ink jet type, and may be another printing method such as a thermal type.

Further, the functions of the terminal controller 10, the parent printer controller 20, and the child printer controller 30 may be implemented by a plurality of processors or semiconductor chips.

Moreover, respective units shown in FIGS. 1 and 2 are an example, and the present disclosure is not particularly limited to a specific mounting form. That is, it is not always necessary to implement hardware corresponding to respective units, but it is of course possible to construct a configuration in which the functions of the respective units are implemented by executing a program by one processor. In addition, in the above embodiments, part of the functions implemented by software may be implemented by hardware, or part of the functions implemented by hardware may be implemented by software. In addition, specific detailed configurations of other units of the terminal device 1, the parent printer 2, and the child printer 3 can be changed in any manner without departing from the scope of the present disclosure.

Further, for example, the step units of the operations shown in FIGS. 3A and 3B are divided in accordance with the main processing contents in order to facilitate understanding of the operations of the respective sections of the printing system 100. The present disclosure is not limited by the method and name of division of the processing stage. Depending on the processing contents, the process may be divided into more step units. Further, one step unit may be divided so as to include more processes. In addition, the order of the steps may be changed as appropriate within the scope of the present disclosure.

What is claimed is:

1. A printing system comprising:
a terminal device that generates print job data; and
a second printing apparatus configured to communicate with a first printing apparatus that receives the print job data from the terminal device, the second printing apparatus being configured to perform printing based on the print job data, wherein
the terminal device stores the generated print job data and transmits, to the first printing apparatus, first data including the stored print job data and a plurality of pieces of access information for accessing the terminal device, and wherein
the second printing apparatus requests a transmission of the print job data from the terminal device based on the plurality of pieces of access information included in the first data received by the first printing apparatus.

2. The printing system according to claim 1, wherein
the second printing apparatus
receives second data including the plurality of the access information from the first printing apparatus, selects the access information from the plurality of pieces of access information included in the received second data, and requests a transmission of the print job data from the terminal device based on the selected access information.

3. The printing system according to claim 2, wherein
the access information includes an IP address, and wherein
the second printing apparatus preferentially selects the access information including an IP address closer to an IP address of the second printing apparatus.

4. The printing system according to claim 2, wherein
the second printing apparatus
stores the access information with which the second printing apparatus accessed the terminal device in the past, and preferentially selects the access information identical to the stored access information.

5. The printing system according to claim 1, wherein
the second printing apparatus receives the print job data from the first printing apparatus when failing to receive, from the terminal device, the print job data due to a transmission request, and performs printing based on the received print job data.

6. The printing system according to claim 1, comprising:
the first printing apparatus, wherein
the first printing apparatus selects the access information from the plurality of pieces of access information included in the first data received from the terminal device, and transmits second data including the selected access information to the second printing apparatus, and wherein
the second printing apparatus receives the second data from the first printing apparatus, and requests a transmission of the print job data from the terminal device based on the access information included in the received second data.

7. The printing system according to claim 1, wherein
the plurality of pieces of access information includes temporary access information that is the access information with which the terminal device is configured to be temporarily accessed and the access information other than the temporary access information.

8. A printing apparatus configured to communicate with another printing apparatus that receives, from a terminal device, first data including print job data and a plurality of pieces of access information for accessing the terminal device, the printing apparatus being configured to perform printing based on the print job data, the printing apparatus comprising:
a printing apparatus communication unit; and
a printing apparatus controller that controls the printing apparatus communication unit, wherein
the printing apparatus controller
causes the printing apparatus communication unit to request a transmission of the print job data from the terminal device based on the plurality of pieces of access information included in the first data received by the another printing apparatus.

9. A terminal device that generates print job data, the terminal device comprising:
a storage unit that stores the print job data;
a terminal communication unit; and
a terminal controller that controls the terminal communication unit, wherein
the terminal controller
causes the terminal communication unit to transmit, to a first printing apparatus, first data including print job data stored in the storage unit and a plurality of pieces of access information for accessing the terminal device, and
causes the terminal communication unit to transmit the print job data to a second printing apparatus when the second printing apparatus requests a transmission of the print job data based on the plurality of pieces of access information included in the first data transmitted to the first printing apparatus.

* * * * *